United States Patent [19]

Barry, Jr.

[11] Patent Number: 5,176,851
[45] Date of Patent: Jan. 5, 1993

[54] METHOD FOR ENHANCING POLYANILINE CONDUCTIVITY

[75] Inventor: Carey N. Barry, Jr., Spartanburg, S.C.

[73] Assignee: Milliken Research Corporation, Spartanburg, S.C.

[21] Appl. No.: 577,730

[22] Filed: Sep. 4, 1990

[51] Int. Cl.$^5$ .............................................. H01B 1/00
[52] U.S. Cl. ...................... 252/500; 427/256; 427/385.5; 427/407.1; 427/407.2; 528/422; 528/490; 528/491; 528/502; 528/503
[58] Field of Search ............... 528/422, 490, 491, 502, 528/503; 252/500; 427/256, 385.5, 407.1, 407.2

[56] References Cited

U.S. PATENT DOCUMENTS

| 4,822,638 | 4/1989 | Yaniger | 252/500 |
| 4,851,487 | 7/1989 | Yaniger | 528/422 |
| 4,855,361 | 8/1989 | Yaniger | 252/500 |
| 4,983,322 | 1/1991 | Eisenbaumer | 252/500 |
| 5,002,700 | 3/1991 | Otagawa et al. | 252/500 |
| 5,006,278 | 4/1991 | Eisenbaumer | 427/385.5 |
| 5,008,041 | 4/1991 | Cameron et al. | 528/422 |

Primary Examiner—Karl Group
Assistant Examiner—Anthony J. Green
Attorney, Agent, or Firm—Timothy J. Monahan; H. William Petry

[57] ABSTRACT

A process for heat treating substituted and/or unsubstituted polyaniline which has been doped with a relatively non-volatile acid is provided. Subjecting polyaniline to temperatures of between 70° C. and 200° C. for a moderate amount of time dramatically lowers the resistance, and therefore increase the conductivity, of the polyaniline. Heat treatment of polyaniline may be advantageously combined with a subsequent rinsing step to produce a sample which has superior stability and good conductivity.

24 Claims, No Drawings

METHOD FOR ENHANCING POLYANILINE CONDUCTIVITY

BACKGROUND OF THE INVENTION

1. Field of the Invention

This invention relates to a process for enhancing the conductivity of substituted and unsubstituted polyaniline. In particular, polyaniline coated textile fibers are heated for a brief period of time to achieve a significant increase in conductivity.

2. Prior Art

Aniline is known to polymerize into at least five different forms of polyaniline, e.g., leucoemeraldine, protoemeraldine, emeraldine, nigraniline and pernigraniline. Not all of the forms of polyaniline are conductive. However, after suitable doping with a counter ion, the emeraldine form has demonstrated relatively good conductivity and has been the focus of extensive research The conductivity of the emeraldine base form of polyaniline and 50% protonated emeraldine hydrochloride was found to increase when exposed to about four torr of water vapor. Angelopaulos, et al. "Polyaniline: Processability from Aqueous Solutions and Effect of Water Vapor on Conductivity", Synthetic Metals, 21, (1987), pp. 21-30. Additional research on influence of moisture on conductivity was reported by Javadi, H., "Conduction Mechanism of Polyaniline: Effect of Moisture", Synthetic Metals 26 (1988), pp. 1-8.

The effect of temperature on the stability of polyaniline in terms of electrical conductivity has been the subject of prior investigation. In Wei, et al. "Thermal Analysis of Chemically Synthesized Polyaniline and Effects of Thermal Aging on Conductivity", Journal of Polymer Science, Vol. 27 (1989), pp. 4351-63, thermal aging was found to lead to deterioration in the conductivity of hydrochloric acid doped polyaniline. However, redoping the polyaniline with hydrochloric acid partially reversed the degradation. Various other investigators have found an accelerated loss of conductivity upon subjecting polyaniline to increased temperatures: Neoh, et al. "Stability Studies of Polyaniline", Polymer Degradation and Stability 27 (1990), pp. 107-117, hydrochloric acid doped polyaniline shows a decrease in conductivity after exposure to temperatures above 60° C.; Hagiwara, T., et al. "Thermal Stability of Polyaniline", Synthetic Metals 25 (1988) pp. 243-252 the conductivity of hydrochloric acid doped polyaniline decreased while the sample was held at 150° C. The crystallinity of doped and undoped polyaniline was found to increase at temperatures up to 150° C. Fosong, W., et al. "Study on the Crystallinity of Polyaniline", Mol. Cryst. Liq. Cryst., Vol 160 (1988), pp. 175-184. Fosong, et al. also found that use of small molecular sized dopants, such as HCl, lead to higher crystallinity.

Similarly, prior art references addressing the thermal stability of polypyrole indicate a decrease in conductivity after heat treatment. Kuhn, U.S. Pat. No. 4,803,096 and Munstedt, "Ageing of Electrically Conducting Organic Materials" Polymer 29(2) (1988) pp. 296-302.

The desire to form compositions of polyaniline and thermoplastic polymers has led to the development of more thermally stable polyanilines. In particular, polyaniline doped with p-toluene sulfonic acid is disclosed as suitable for melt processing with thermoplastic polymers in International Patent Application Number PCT/US88/02319 by Jen et al., entitled "Thermally Stable Forms of Electrically Conductive Polyaniline". Examples of suitable polymers and their typical melt processing temperatures are: polyethylene, 400°-450° F.; polypropylene, 450°-500° F.; nylon 6, 450°-500° F.; nylon 6,6, 500°-600° F.; polyethylene terephthalate, 500°-600° F., and polyester, 500°-600° F. Other references showing a relationship between the dopant selected and the thermal stability of the doped polyaniline are Kulkarni et al , "Thermal Stability of Polyaniline", Synthetic Metals 30, pp. 321-325 (1989) and Elsenbaumer et al., "Stability of Doped Conducting Polymers", Allied-Signal, Inc., Corporate Research, Morristown, N.J.

SUMMARY OF THE INVENTION

One of the drawbacks of polyaniline and other conductive polymers has been their relatively high resistivity compared to traditional means for conducting electricity such as metal wire. Certainly, any process capable of improving the performance of polyaniline would significantly expand its application and be of great commercial value. Applicant, by employing select dopants and moderate heat treatment has provided a process for enhancing the conductivity of polyaniline. Similarly, a polyaniline coated substrate manufactured and treated according to the aforementioned process is provided.

Polyaniline must be protonated to be conductive. Typically, protonation is accomplished by the presence of a water soluble acid in the reaction mixture when aniline is polymerized, rendering the polyaniline conductive. Protonation of polyaniline is commonly referred to as doping. To practice the invention herein, the water-soluble acid should be non-volatile, preferably having a boiling point above 25° C. Further, the dopant should be a strong acid, preferably with a pKa of less than 4.8.

Alternatively, polyaniline can be polymerized in the presence of one water-soluble acid, thoroughly rinsed with a solvent such as water or alcohol to remove this acid and re-doped by treatment with a second, non-volatile, water-soluble acid. Generally, if the polyaniline is to be re-doped after rinsing, a volatile acid such as hydrochloric acid may be employed during polymerization instead of a non-volatile acid. However, if the non-volatile acid to be used as a dopant has a relatively high molecular weight, e.g., 1,5-naphthalene-disulfonic acid, it should be present during polymerization, rather than used to re-dope the polyaniline.

The conductivity of polyaniline which has been doped with a non-volatile acid according to the methods set forth herein, can be enhanced by subsequent heat treatment. The polyaniline to be subjected to heat treatment may be wet, or it can be air dried first. In a preferred embodiment, polyaniline is deposited on a substrate, such as a fabric, during polymerization and remains on the substrate throughout the treatment process.

Heat treatment of polyaniline according to the present invention entails heating the polyaniline for a length of time sufficient to enhance the polyaniline's conductivity. The length of treatment time necessary to enhance conductivity relative to an identically doped sample dried at ambient conditions is dependent upon the treatment temperature. For example, at 200° C. conductivity was doubled in 45 seconds, whereas at 70° C. a significant improvement in conductivity was not seen until approximately ten minutes of treatment and maximum conductance was not obtained until after an hour.

Preferably, the polyaniline is removed from heat treatment and cooled to ambient temperature when conductivity has reached a maximum. The polyaniline will continue to show enhanced conductivity relative to an untreated control for several months. However, unless special precautions are taken to protect polyaniline from the environment, both treated and untreated polyaniline will gradually lose its conductivity. Eventually, the heat treated sample may become less conductive than the untreated control if both are held under comparable aging conditions.

Once a polyaniline sample has reached maximum conductivity during heat treatment, continued subjection to heat treatment may have an adverse impact. The rate at which overheating tends to diminish the conductivity of polyaniline is strongly dependent upon the treatment temperature. At 200° C., improvements in conductivity are lost after only three minutes of treatment. However, samples held at 175° C. for approximately 30 minutes continue to show improvements over an untreated control. Further, polyaniline held at 100° C. for several days continues to demonstrate enhanced conductivity. Only after about 14 days at 100° C. does the conductivity of polyaniline decrease to levels comparable to an untreated control.

A further feature of the invention is that polyaniline which has been heat treated according to the aforementioned process may be subsequently rinsed with a solvent such as water or an alcohol to increase the stability of the polyaniline. In other words, a sample which has been heat treated to enhance conductivity and rinsed with a suitable solvent will exhibit increased stability, i e., electrical performance is slower to degrade relative to an untreated sample.

DESCRIPTION OF THE PREFERRED EMBODIMENT

Without limiting the scope of the invention, the preferred embodiment of the invention is hereinafter set forth.

The invention may be practiced with substituted or unsubstituted polyaniline or a combination of the two. By way of example and not by limitation, the following monomer units may be polymerized and used herein: aniline, o- and m- methoxyaniline, o- and m- ethoxyaniline, o- and m- toluidine, o- and mchloroaniline, and monomer units having the formula

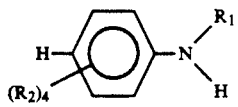

wherein $R_1$ is hydrogen or alkyl; and $R_2$ is at each occurrence, selected independently from hydrogen, alkyl, alkoxy, aryloxy, amino, alkylamino, dialkylamino, aryl, halogen, cyano, sulfonic acid and nitro. The emeraldine form of polyaniline is preferred, but other conductive oxidation states of polyaniline may be employed by those with skill in the art.

Polyaniline must be protonated to be conductive, preferably with a strong acid. Doping may be accomplished by polymerization in a solution containing the acid. Alternatively, the polymerization reaction may initially take place in the presence of one acid which is then rinsed from the polyaniline, followed by re-doping the polyaniline in a bath containing a different acid.

Acids useful as dopants have a relatively high boiling point, above 25° C., and are termed non-volatile acids herein. However, acids having a boiling point between 25° C. and 150° C. may not perform well at the higher heat treatment temperatures, near 200° C., due to their volatility. More preferably, acids having a boiling point above 150° C. are employed as dopants.

In addition to being non-volatile, acids useful as dopants are relatively strong acids. Acids having a pKa of less than 4.8 may be used while those having a pKa less than 3.0 are preferred. The concentration of acid, whether present during polymerization or in a solution used to re-dope the polyaniline, is typically between 0.25 molar and 2 molar. However, the concentration range is not believed to be critical to the invention and may be varied outside the preferred ranges without deviating from the invention.

Illustrative of acids suitable for use as dopants prior to heat treatment of polyaniline are:
p-toluenesulfonic acid,
benzenesulfonic acid,
p-chlorobenzenesulfonic acid,
trifluoromethanesulfonic acid,
1,5-naphthalenedisulfonic acid,
2,6-naphthalenedisulfonic acid, and
sulfuric acid.

The non-volatile acid preferably contains a sulfonic acid group or is sulfuric acid.

Unexpectedly, the larger, higher molecular weight acids, for example, MW greater than 275, such as 1,5-naphthalenedisulfonic acid and 2,6-naphthalenedisulfonic acid, are useful as dopants only if they are present during polymerization of polyaniline. If the aforementioned, high molecular weight acids are used to re-dope polyaniline which has been polymerized in HCl for example, improved conductivity following heat treatment is not realized.

A wide variety of chemical and electrochemical syntheses of electrically conductive polyaniline are known and well documented in the prior art. In a preferred embodiment, polymerization of substituted or unsubstituted aniline is carried out in an aqueous solution of a non-volatile acid at a temperature below 25° C., most preferably at −5° to 5° C. A catalytic amount of an oxidizing agent such as sodium vanadate may be present. Next, an oxidizing agent is added to the solution while the resulting mixture is agitated and cooled. By way of example, suitable oxidizing agents are: persulfate salts, e.g., ammonium persulfate, vanadium V compounds, e.g., sodium vanadate and iodate salts, e.g., potassium iodate. The oxidizing agents are present in sufficient amount to oxidize the desired amount of aniline.

The following publication, incorporated by reference, discloses suitable monomers, oxidizing agents, dopant concentrations and reaction conditions for the formation of polyaniline: MacDiarmid et al., Conducting Polymers, L. Alcacer (ed.), D. Reidel Publishing Co., Dordrecht, The Netherlands (1987). The invention may be practiced with a polyaniline coated substrate, preferably a fabric. The fabric is present during polymerization according to the aforementioned method and is coated with approximately 1 to 25 weight percent polyaniline based on the weight of the fabric. Suitable fabrics include wovens, non-wovens and knits made from polyester, e.g. polyethylene terephthalate, polyamide, e.g. nylon 6, nylon 6,6, blends of synthetic and natural fibers, for example cotton and wool, and high modulus inorganic fibers such as glass and quartz. Additional substrates include ceramic fibers, aramid, PEEK, benzimidazol and the like. The disclosure in Kuhn et al., U.S. Pat. No. 4,803,096 is illustrative of electrically conductive textile materials and their preparation, and is incorporated by reference.

A general outline of the three methods used to prepare the fabric coated polyaniline for the examples presented below are as follows:

METHOD A

Approximately 5 g of fabric is placed in an 8 ounce jar. Generally, about 150 g of total liquor are used in the following manner: a solution of an acid in water (about 45 mL) is added to the jar and the closed jar rotated at 0° to 5° C. for several minutes to wet out the fabric. A solution of the aniline derivative in water (about 43 mL) is then added and the mixture rotated in an ice/water bath for several minutes. Finally, a solution of the oxidizing agent in water (about 44 mL) is added to the jar in one portion. The resulting mixture is rotated in an ice/water bath at about 60 rpm for the appropriate length of time. The fabric is withdrawn and can be subjected to the heat treatment while wet or it can be air dried first.

Alternatively, the fabric sample can be thoroughly rinsed after it is removed from the jar. This results in significant loss of the dopant but the sample can be re-doped by treatment with a fresh solution of aqueous acid. The polyaniline coated fabric may be subjected to heat treatment while wet or it can be air dried first.

METHOD B

Approximately 65 g of fabric is placed in a dyeing machine having a rotating basket. Generally, about 1950 g of total liquor is added to the dye machine in the following manner: a solution of an acid in water (about 590 mL) is added to the dye machine and the basket rotated and cooled (0°-5° C.). A catalytic amount of an oxidizing agent may be added to the aqueous acid if desired. A solution of the aniline derivative in water (about 560 mL) is added while continuing rotation and cooling. Finally, a solution of an oxidizing agent in water (about 670 mL) is added continuously to the rotating and cooled mixture. Following addition, the fabric is rotated and cooled for an appropriate length of time. The sample is withdrawn and prepared to heat treatment as described in Method A, i.e., the sample may be redoped and/or air dried prior to treatment.

METHOD C

Generally, this method involves three steps. in the first step a sample is coated with polyaniline or substituted polyaniline according to method A or method B. The sample is then heat treated according to method A. Finally, the sample is immersed in an aqueous or alcoholic solvent with minimal agitation for an appropriate length of time and dried. The sample can be dried in an oven or air dried.

Heat treatment of polyaniline, in its general sense, involves heating doped polyaniline or polyaniline coated substrate to a sufficient temperature above ambient conditions to lower resistance. After the heated polyaniline has reached a minimum resistance, the polyaniline is cooled or removed from the heat source, as continued exposure to the heat is likely to accelerate aging or degrade the sample.

The rate at which heat treatment lowers the resistance of polyaniline is strongly temperature dependant. At 70° C., polyaniline reaches a minimum resistance in approximately one to two hours. At 200° C., minimum resistance is achieved in less than two minutes. Likewise, the heat treatment temperature affects the rate of aging and degradation of the polyaniline. After 3 minutes at 200° C., the resistance of polyaniline is greater than polyaniline which has not been heat treated. However, polyaniline held at 100° C. for over ten days demonstrates lower resistance than an untreated sample held at ambient conditions for the same time. At temperatures lower than 100° C., polyaniline may be heated for longer than two weeks without adversely affecting the enhanced conductivity properties which heat treatment has provided.

At treatment temperatures much above 200° C., there is a narrow time difference between when the polyaniline reaches minimum resistance and when the resistance becomes worse than an untreated control. Lowering the heat temperature to 175° C. increases the treatment time during which beneficial results are realized up to 30 minutes. At temperatures between 70° C. and 150° C., polyaniline heat treated for over an hour will continue to exhibit significantly reduced resistance.

It is believed that reductions in resistance of 25% or more can be achieved commercially using the methods herein. More preferably, the resistance is lowered 50% or more compared to an identically doped, untreated polyaniline sample.

The heat treatment may be performed in an oven at atmospheric pressure. No special provisions are necessary for the environment in the oven and air having normal humidity is sufficient. The heat treatment method herein is effective when both wet and dry polyaniline is used. The polyaniline may be wet from polymerization in an aqueous solution or it may be one prepared by re-doping with an aqueous solution. Alternatively, polyaniline is air dried at ambient conditions prior to heat treatment Subsequent to heat treatment, a polyaniline sample which has been doped with a non-volatile acid according to the aforementioned process may be rinsed with a polar solvent to increase its stability. Suitable solvents are aqueous solvents and alcohols, preferably water or methanol.

A heat treated sample may be rinsed by immersion in the solvent, with or without agitation. Rinse times of 30 seconds or less have been found to be efficacious. Immersing a sample for longer than four minutes in a bath was not found to significantly improve stability. However, rinse times of longer than four minutes were not detrimental. Those with skill in the art may incorporate other techniques for rinsing a sample depending on the nature of the sample and substrate. For example, a polyaniline coated textile material may be run through a bath or have solvent sprayed on it.

After the appropriately doped and heat treated polyaniline sample is rinsed, it may be dried under ambient conditions or in an oven. If an oven is employed, the temperature should be below that which will cause immediate degradation of the polyaniline or volatilize the dopant. Temperatures below 200° C. are recommended, while temperatures at 100° C. or below are preferred.

While the previously described heat treatment has the effect of lowering the resistance of a polyaniline sample, subsequent rinsing generally raises the resistance. For most applications, the rise in resistance following rinsing is compensated by the greater stability or conductive life of the polyaniline. An advantage of the invention is that the increase in resistance resulting from rinsing is measured from the lowered resistance of a heat treated sample. Thus, the combination of heat treatment and rinsing produces a sample with superior stability without sacrificing conductivity compared to a sample which has not been heat treated prior to rinsing.

The invention may be further understood by reference to the following examples, but the invention is not to be construed as being unduly limited thereby. Unless, otherwise indicated, all parts and percentages are by weight percent.

The resistance of the polyaniline coated substrate was measured by: AATCC test method 76-1982. This procedure is described in Kuhn et al., U.S. Pat. No. 4,803,096. Methods of measuring the resistance of polyaniline powders and films are known to those in the field.

Examples 1-4 demonstrate the process applied to a variety of substrates which have been doped with p-toluenesulfonic acid (p-TSA) and heat treated at 100° C. The results are summarized in Table I below.

EXAMPLE 1

Following the procedure described for Method B, 65 g of a polyester fabric consisting of a 2×2 right hand twill, weighing about 6.6 oz per square yard and being constructed from a 2/150/34 textured polyester yarn from Celanese Type 667 (fabric construction is such that about 70 ends are in the warp direction and 55 picks are in the fill direction) was placed in a Werner Mathis JF dyeing machine using 183.3 g of p-toluenesulfonic acid monohydrate (p-TSA H$_2$O) and 0.29 g of sodium vanadate in 735 mL of water, 6.89 g of aniline in 280 mL of water and 9.70 g of ammonium persulfate (APS) in 735 mL of water. The APS solution was added continuously to the cooled mixture over three hours and cooling was continued for an additional hour. The rotating chamber was then allowed to warm to ambient temperature over 3 hours and the sample withdrawn. The dark green sample was divided into two portions and one was dried at ambient temperature (air dried), affording a medium green sample with a resistance of 91 ohms per square. The other half was mounted on a pin frame and placed in an oven at 100° C. for 20 min. This also afforded a medium green sample but with a resistance of 41 ohms per square.

EXAMPLE 2

Example 1 was repeated except that 65 g of nylon fabric, constructed from an untextured continuous filament of Nylon 6, is used. In addition, the sample was rinsed with a 0.5M solution of p-TSA after removal from the polymerization bath. The air dried sample had a resistance of 720 ohms per square compared to 574 ohms per square for the heat treated sample.

EXAMPLE 3

Following the procedure described for Method B, 59 g of a quartz fabric obtained from J. P. Stevens (Astroquartz Style 581, satin weave) is placed in a Werner Mathis JF dyeing machine using 166.4 g of p-TSA H$_2$O and 0.26 g of sodium vanadate in 667 ml of water, 6.25 g of aniline in 254 mL of water and 8.80 g of ammonium persulfate in 667 mL of water. The APS solution was added continuously to the cooled mixture over three hours and cooling was continued for an additional hour. The rotating chamber was then allowed to warm to ambient temperature over 3 hours and the sample withdrawn. The dark green sample was rinsed in 0.5M p-TSA (2 L) and divided into two portions. One portion was air dried affording a medium green sample with a resistance of 1,800 ohms per square. The other half was mounted on a pin frame and placed in an oven at 100° C. for 20 min. This also afforded a medium green sample but with a resistance of 200 ohms per square.

EXAMPLE 4

Following the procedure described for Method A, 5.0 g of a glass fabric was placed in an 8 oz jar using 14.12 g of p-TSA H$_2$O in 45 mL of water, 1.06 g of aniline in 43 mL of water and 1.49 g of APS in 45 mL of water. The mixture was rotated in an ice/water bath for an hour, allowed to warm to ambient temperature and rotation continued for about 16 hours. The sample was withdrawn, thoroughly rinsed with water (7×500 mL), and redoped in 0.5M p-TSA (2×250 mL). One half of the sample was air dried affording a resistance of 500 ohms per square, and the other half heated for 10 min at 100° C. to give a resistance of 100 ohms per square.

TABLE 1

| Example Number | Substrate | Dopant | Temperature | Time (Mins) | Resistance ohms per sq. |
|---|---|---|---|---|---|
| 1 | Polyester Fabric | p-TSA | 100° C. | 20 | 41 |
|   | Polyester Fabric | p-TSA | Air dried | — | 91 |
| 2 | Nylon 6 Fabric | p-TSA | 100° C. | 20 | 574 |
|   | Nylon 6 Fabric | p-TSA | Air dried | — | 720 |
| 3 | Quartz Fabric | p-TSA | 100° C. | 20 | 200 |
|   | Quartz Fabric | p-TSA | Air dried | — | 1800 |
| 4 | Glass Fabric | p-TSA | 100° C. | 10 | 100 |
|   | Glass Fabric | p-TSA | Air dried | — | 500 |

EXAMPLE 5

This example demonstrates the effect of heat treatment duration on resistance as compared to a sample kept at ambient temperature and humidity.

A sample of polyester fabric was prepared as described in example 1. After the sample was withdrawn from the polymerization liquor, it was thoroughly washed with water (7×2L) and redoped with 0.5M p-TSA (2×1L). The sample was air dried giving a resistance of about 108 ohms per square. Two test samples were cut out and one was placed in an oven at 100° C. while the other was kept at ambient temperature and humidity. The resistance of each sample was measured periodically. The results are shown in TABLE 2.

TABLE 2

| Time | Ambient Sample Resistance (ohms per square) | Heated Sample Resistance (ohms per square) |
|---|---|---|
| 0 | 109 | 107 |
| 15 min | — | 24 |
| 1 day | 106 | 25 |
| 2 days | 106 | 30 |

TABLE 2-continued

| Time | Ambient Sample Resistance (ohms per square) | Heated Sample Resistance (ohms per square) |
| --- | --- | --- |
| 3 days | 109 | 33 |
| 8 days | 114 | 58 |
| 9 days | 122 | 60 |
| 11 days | 128 | 90 |
| 14 days | 138 | 145 |
| 15 days | 147 | 130 |
| 21 days | 178 | 273 |

EXAMPLE 6

This example demonstrates that a decrease in resistivity is not obtained when a volatile acid is used.

Following the procedure described for Method A, 5.0 g of a polyester fabric (described in example 1) was placed in an 8 oz jar using 52 mL of 1.0M HCl, 1.06 g of aniline in 43 mL of water and 1.49 g of APS in 52 mL of 1.0M HCl. The mixture was rotated in an ice/water bath for an hour, allowed to warm to ambient temperature and rotation continued for about 16 hours. The dark green sample was withdrawn and air dried resulting in a resistance of 190 ohms per square. The sample was placed in an oven at 100° C. and the resistance measured at 2 min and 4 min giving 346 ohms per square and 464 ohms per square, respectively. Longer heating times have been shown to result in further increases in resistance.

EXAMPLE 7

This example demonstrates that a wide variety of nonvolatile acids can be used in the present invention to re-dope a sample polymerized HCl.

A 65 g sample of polyester fabric (described in example 1) was coated with polyaniline according to Method B using 827 mL of 1.0M HCl, 6.89 g of aniline in 280 mL of water and 9.70 g of APS in 827 mL of 1.0M HCl. The resulting dark green fabric was thoroughly washed with water (7×2L) and then cut into several pieces. Each piece was redoped by two 15 min treatments with a 0.5M solution of aqueous acid (200 mL per treatment). The samples were air dried and heated at 100° C. for 5 min. The results are given in TABLE 3.

TABLE 3

| Acid | Resistance (ohms per square) | |
| --- | --- | --- |
| | Before Heat Treatment | After Heat Treatment |
| Methanesulfonic Acid | 383 | 56 |
| Benzenesulfonic Acid | 377 | 46 |
| 4-Chlorobenzene-sulfonic Acid | 426 | 64 |
| p-Toluenesulfonic Acid | 762 | 89 |
| Trifluoromethane-sulfonic Acid | 1,060 | 241 |
| Sulfuric Acid [b] | 507 | 176 |
| 1,5-Naphthalene-disulfonic Acid | 1,410 | 2,270 |
| Trifluoroacetic Acid | 2,130 | 27,600 |
| Hydrochloric Acid [a,b] | 746 | 4,400 |

[a] Redoped with 1.0 M HCl
[b] Two minute heat treatment

EXAMPLE 8

This example demonstrates polymerization in the presence of 1,5-naphthalenedisulfonic acid.

Following the procedure described for Method A, 5.0 g of a polyester fabric (described in Example 1) was placed in an 8 oz jar using 27.03 g of 1,5-naphthalenedisulfonic acid in 38.7 mL of water, 1.06 g of aniline in 43 mL of water and 1.49 g of APS in 38.7 mL of water. The mixture was rotated in an ice/water bath for an hour, allowed to warm to ambient temperature and rotation continued for about 16 hours. The sample was withdrawn and air dried affording a sample with a resistance of 406 ohms per square. Two samples of this specimen were placed in an oven at 100° C. for 20 min yielding an average resistance of 215 ohms per square.

EXAMPLE 9

This example demonstrates polymerization in the presence of p-chlorobenzenesulfonic acid followed by rinsing and re-doping with p-TSA.

Following the procedure described for Method A, 5.0 g of a polyester fabric (described in example 1) was placed in an 8 oz jar using 19.30 g of p-chlorobenzenesulfonic acid in 43 mL of water, 1.06 g of aniline in 42 mL of water and 1.59 g of sodium vanadate in 43 mL of water. The mixture was rotated in an ice/water bath for an hour, allowed to warm to ambient temperature and rotation continued for about 16 hours. The sample was withdrawn, rinsed for 30 sec in 0.5M p-TSA (250 mL) and air dried. The sample was then placed in an oven at 71° C. for 24 hours. The resulting resistance was 30 ohms per square compared to 81 ohms per square prior to heat treatment.

EXAMPLE 10

This example demonstrates changes in resistance versus time for sample held at 50° C. and 70° C.

A 65 g sample of polyester fabric (described in example 1) was coated with polyaniline as described in Example 1. The resulting dark green fabric was removed from the polymerization bath, thoroughly washed with water (7 x 2 L), redoped in 0.5M p-TSA H$_2$O (2×1L) and air dried. Four samples (2 in×2 in) were taken from the specimen; 2 were heated at 50° C. and 2 were heated at 70° C. Average resistance measurements at several time intervals are given in TABLE 4.

TABLE 4

| Time (min) | Resistance (ohms per square) | |
| --- | --- | --- |
| | 50° C. | 70° C. |
| 0 | 107 | 101 |
| 10 | 107 | 85 |
| 20 | 107 | 80 |
| 30 | 110 | 79 |
| 40 | 103 | 72 |
| 50 | 100 | 71 |
| 60 | 100 | 69 |
| 120 | 101 | 66 |
| 180 | 98 | 66 |
| 240 | 100 | 66 |
| 300 | 99 | 65 |
| 360 | 102 | 66 |
| 420 | 102 | 66 |
| 480 | 104 | 65 |

EXAMPLE 11

This example demonstrates changes in resistance versus time for samples held at 175° C. and 200° C.

Following the procedure described for Method B, 65 g of a glass fabric (described in Example 4b) was placed in a Werner Mathis JF dyeing machine using 83.3 g of p-TSA H$_2$O and 0.58 g of sodium vanadate in 586 mL of water, 13.8 g of aniline in 560 mL of water and 19.4 g of ammonium persulfate in 586 mL of water. The APS solution was added continuously to the cooled mixture over three hours and cooling was continued for an additional hour. The rotating chamber was then allowed to warm to ambient temperature over 3 hours. The sample was withdrawn and air dried overnight. Four samples (2 in×2 in) were taken from the specimen; 2 were heated at 175° C. and 2 were heated at 200° C. Average resistance measurements at several time intervals are given in TABLE 5.

TABLE 5

| Time (min) | Resistance (ohms per square) | |
|---|---|---|
| | 175° C. | 200° C. |
| 0 | 416 | 545 |
| 0.75 | — | 199 |
| 1.50 | — | 263 |
| 2.25 | — | 395 |
| 2.50 | 125 | — |
| 3.00 | — | 582 |
| 5.00 | 162 | — |
| 10.00 | 190 | — |
| 15.00 | 244 | — |
| 20.00 | 309 | — |
| 25.00 | 335 | — |

EXAMPLE 12

This example demonstrates heat treatment at 150° C.

Following the procedure described for Method B, 65 g of a polyester fabric (described in example 1) was placed in a Werner Mathis JF dyeing machine using 183.3 g of p-TSA H$_2$O and 0.29 g of sodium vanadate in 735 mL of water, 6.89 g of aniline in 280 mL of water and 9.70 g of APS in 735 mL of water. The APS solution was added continuously to the cooled mixture over three hours and cooling was continued for an additional hour. The rotating chamber was then allowed to warm to ambient temperature over 3 hours. The dark green sample was withdrawn and air dried. Several samples were cut from the mother sample and placed in an oven at 150° C. for 2.5 minutes. The average resistance after heat treatment was 37 ohms per square compared to 87 ohms per square prior to treatment.

EXAMPLE 13

This example demonstrates heat treatment of substituted polyaniline.

Following the procedure described for Method B, 65 g of a polyester fabric (described in example 1) was placed in a Werner Mathis JF dyeing machine using 169.2 g of p-TSA H$_2$O and 0.27 g of sodium vanadate in 689 mL of water, 9.11 g of o-anisidine and 14.08 g of p-TSA H$_2$O in 370 mL of water and 9.70 g of APS in 689 mL of water. The APS solution was added continuously to the cooled mixture over three hours and cooling was continued for an additional hour. The rotating chamber was then allowed to warm to ambient temperature over 3 hours. The dark green sample was withdrawn, thoroughly rinsed with water (7×2L) and re-doped with 0.5M p-TSA (2×1L). After air drying, several samples were placed in an oven at 100° C. for 10 min affording an average resistance of 65,000 ohms per square compared to 96,000 ohms per square prior to heat treatment.

EXAMPLE 14

This example demonstrates that a decrease in resistance is realized even when the sample is thoroughly dried prior to heat treatment.

A polyaniline coated sample of polyester was prepared as described in example 5 stopping short of the heat treatment. Two samples were cut out which averaged 119 ohms per square. These samples were placed in a vacuum desiccator over Drierite and placed under dynamic vacuum for 4 hours. The desiccator was closed off and the samples were kept under static vacuum (<1 torr) for about 66 hours. A dynamic vacuum was reestablished and maintained for about 28 hours. The samples were removed and the resistance immediately measured at 107 ohms per square. These samples were immediately placed in an oven at 100° C. for 5 min and the resistance measured at 33 ohms per square.

Examples 15-20 are directed to procedures for improving the stability of polyaniline, as measured by resistance, which involve rinsing a polyaniline coated fabric with water or an alcohol following heat treatment. Comparative test data is provided demonstrating a significant increase in stability as well as the immediate effect that rinsing has on resistance.

EXAMPLE 15

This example demonstrates a procedure for increasing the environmental stability of polyaniline by rinsing with water following heat treatment.

A 65 g sample of polyester fabric (described in example 1) was prepared according to Method B followed by treatment according to Method C using 183.3 g of p-TSA H$_2$O and 0.29 g of sodium vanadate in 735 mL of water, 6.89 g of aniline in 280 mL of water and 9.70 g of APS in 735 mL of water. The APS solution was added continuously to the cooled mixture over three hours and cooling was continued for an additional hour. The rotating chamber was then allowed to warm to ambient temperature over 3 hours and the sample withdrawn. The dark green sample was thoroughly rinsed with water (7×2L), redoped with 10 min treatments with 0.5M p-TSA (2×1L) and air dried. One half of the sample was heat treated at 100° C. for 15 min, immersed in water with low agitation for 30 sec and dried at 100° C. for 5 min. The half which was heat treated, rinsed and dried had a resistance of 70 ohms per square compared to 121 ohms per square for the untreated half.

EXAMPLE 16

This example demonstrates that environmental stability (retention of electrical conductivity in the presence of air and moisture) of polyaniline is increased by successive heat treatment and rinsing.

Two 2 in×2 in samples were taken from the treated and untreated product of example 15. These were placed in an accelerated aging chamber (71° C. and 50% relative humidity) and resistance measured periodically. The averaged results for each portion are given in TABLE 6.

TABLE 6

| Time of Exposure (days) | Resistance (ohms per square) | |
|---|---|---|
| | Untreated | Treated |
| 0 | 125 | 69 |
| 1 | 81 | 66 |

TABLE 6-continued

| Time of Exposure (days) | Resistance (ohms per square) | |
|---|---|---|
| | Untreated | Treated |
| 2 | 83 | 68 |
| 5 | 86 | 74 |
| 6 | 91 | 77 |
| 7 | 107 | 83 |
| 8 | 124 | 81 |
| 13 | 220 | 90 |
| 14 | 395 | 98 |
| 15 | 445[a] | 93 |
| 16 | — | 105 |
| 19 | — | 108 |
| 20 | — | 108 |
| 26 | — | 132 |
| 27 | — | 138 |
| 28 | — | 135 |
| 29 | — | 136 |
| 30 | — | 133 |
| 33 | — | 144 |
| 34 | — | 141 |
| 35 | — | 164 |
| 36 | — | 158 |
| 37 | — | 160 |
| 40 | — | 180 |
| 41 | — | 178 |
| 42 | — | 179 |
| 43 | — | 191 |
| 47 | — | 201 |
| 48 | — | 218[b] |

[a]72% increase in resistance over 15 days.
[b]68% increase in resistance over 48 days.

EXAMPLE 17

This example demonstrates the use of a methanol rinse following heat treatment.

Polyester fabric was coated with polyaniline as described in example 1. After removing the sample from the polymerization bath, the sample was air dried. A portion of this sample was thoroughly rinsed with water (7×2L), redoped with 0.5M p-TSA (2×1L for 10 min each) and placed in an oven at 100° C. for 15 min. Two samples from the heat treated portion were immersed in methanol for 30 seconds at ambient temperature and air dried affording an average resistance of 59 ohms per square. These two samples and two untreated samples (air dried only, no rinsing) were subjected to accelerated aging as described in example 16. The aging results are shown in TABLE 7.

TABLE 7

| Time of Exposure (days) | Resistance (ohms per square) | |
|---|---|---|
| | Untreated | Treated |
| 0 | 101 | 59 |
| 3 | 106 | 54 |
| 4 | 118 | 51 |
| 5 | 137 | 61 |
| 6 | 173 | 77 |
| 11 | 234 | 90 |
| 12 | 470[a] | 115 |
| 13 | — | 128 |
| 14 | — | 123 |
| 17 | — | 120 |
| 18 | — | 110 |
| 19 | — | 135 |
| 20 | — | 155 |
| 21 | — | 154 |
| 24 | — | 157 |
| 25 | — | 161 |
| 26 | — | 205[b] |

[a]79% increase in resistance in 12 days.
[b]71% increase in resistance in 26 days.

EXAMPLE 18

This example demonstrates the relative insensitivity of the heat treated conductive polymer to time of rinsing.

A 65 g sample of polyester fabric (described in example 1) was coated with polyaniline and treated as described in example 5 including the 7 water rinses and redoping. The samples were then heat treated for 15 min at 100° C. Six 12.0 to 12.1 g samples were cut from the mother fabric and placed in six beakers of water (175 mL each). The samples were left in the beakers with agitation for varying lengths of time, removed and dried in an oven at 100° C. for 5 min. The sulfur content of the wash solutions and the resistance of the samples were measured. The results are shown in TABLE 8.

TABLE 8

| Time of Rinse (minutes) | Resistance (ohms per square) | Sulfur in Water (ppm) |
|---|---|---|
| 0 | 24[a] | 0 |
| 0.5 | 46 | 981 |
| 1.0 | 48 | 1,016 |
| 2.0 | 54 | 1,043 |
| 4.0 | 50 | 1,113 |
| 8.0 | 50 | 1,229 |
| 16.0 | 52 | 1,381 |

[a]Result from identical run in example 5.

EXAMPLE 19

This example also demonstrates the relative insensitivity of the heat treated conductive polymer to time of rinsing.

An experiment similar to that described in example 18 was carried out. However, rather than placing the samples in six separate containers of water, all of the samples were placed in one large container of water and removed at various intervals. Thus, six approximately 12 g samples were placed in 1 L of water and gently agitated. The samples were removed at various time intervals and dried in an oven for 5 min. The sulfur content of the samples was measured by X-ray fluorescence spectroscopy. The results are shown in TABLE 9.

TABLE 9

| Time of Rinse (minutes) | Sulfur in Sample (counts per sec) |
|---|---|
| 0.5 | 458 |
| 1.0 | 490 |
| 2.0 | 536 |
| 4.0 | 508 |
| 8.0 | 485 |
| 16.0 | 430 |

EXAMPLE 20

This example demonstrates that environmental stability of the heat treated/rinsed conductive polyaniline is not adversely affected by increased rinse duration.

A 65 g sample of polyester fabric (described in example 1) was coated with polyaniline and treated as described in example 17 including the 7 water rinses, redoping and 15 min heat treatment. The sample was cut into six equal portions and immersed in 1L of water for varying lengths of time. The samples were dried in an oven at 100° C. for five min. Duplicate samples were placed in the accelerated aging chamber (71° C. and 50% relative humidity) and the resistance monitored. The results are shown in TABLE 10.

TABLE 10

| Time of Accelerated Aging (days) | Resistance (ohms per square) Rinse Duration (minutes) | | | | | |
|---|---|---|---|---|---|---|
| | 0.5 | 1.0 | 2.0 | 4.0 | 8.0 | 16.0 |
| 0 | 90 | 119 | 109 | 83 | 85 | 83 |
| 1 | 100 | 121 | 108 | 83 | 86 | 95 |
| 4 | 95 | 128 | 108 | 87 | 90 | 95 |
| 5 | 107 | 146 | 129 | 93 | 98 | 110 |
| 6 | 120 | 178 | 141 | 113 | 112 | 121 |
| 7 | 114 | 173 | 141 | 102 | 104 | 112 |
| 12 | 150 | 218 | 158 | 115 | 125 | 135 |
| 13 | 173 | 265 | 185 | 133 | 143 | 144 |
| 14 | 171 | 276 | 193 | 135 | 149 | 149 |
| 15 | 196 | 335 | 220 | 160 | 172 | 178 |
| 18 | 202 | 334 | 251 | 159 | 179 | 175 |
| 19 | 232 | 360 | 278 | 173 | 198 | 198 |
| 25 | 325 | 579 | 423 | 236 | 255 | 265 |
| 26 | — | — | — | 270 | 278 | — |
| Resistance Increase Per day (%) | 2.9 | 3.2 | 3.0 | 2.7 | 2.7 | 2.7 |

There are, of course, many alternate embodiments and modifications which are intended to be included in the following claims.

What I claim is:

1. A method of treating polyaniline, wherein said polyaniline is a polymer of monomer units selected from aniline, o- and m- methoxyaniline, o- and m- ethoxyaniline, o- and m- toluidine, o- and m- chloroaniline, comprising the steps of: doping said polyaniline with a non-volatile acid, said polyaniline having an initial resistance, heating said polyaniline to a temperature above 70° C. for a period of time sufficient to lower its resistance by at least 25% of said initial resistance, and cooling said polyaniline to ambient temperature while its resistance at a level which is at least 25% of said initial resistance.

2. The method of claim 1 wherein said heating of said polyaniline is to a temperature of between 70° C. and 200° C.

3. The method of claim 2 wherein said non-volatile acid is selected from the group consisting of p-toluene sulfonic acid, benzene sulfonic acid, p-chlorobenzene sulfonic acid, trifluoromethane sulfonic acid and sulfuric acid.

4. The method of claim 3 wherein said polyaniline is a product of chemical oxidation in a reaction solution and said polyaniline is removed from said solution prior to said heating step.

5. The method of claim 2 wherein said polyaniline is formed by the chemical oxidation of said monomer units in the presence of said non-volatile acid which is selected from the group consisting of: p-toluenesulfonic acid, benzenesulfonic acid, p-chlorobenzenesulfonic acid, trifluoromethanesulfonic acid, sulfuric acid, 1,5-naphthalene-disulfonic acid, and 2,6-naphthalenedisulfonic acid.

6. The method of claim 2 wherein said non-volatile acid has a boiling point of 150° C. or greater.

7. The method of claim 6 wherein said non-volatile acid has a pKa of 3.0 or less.

8. The method of claim 2 further comprising the step of rinsing said polyaniline with a polar solvent, following said heating step.

9. The method of claim 8, wherein said solvent is an aqueous solution or an alcohol.

10. The method of claim 8, wherein said solvent is selected from water and methanol.

11. The method of claim 1, wherein said heating of said polyaniline is to a temperature of between 100° C. and 175° C.

12. The method of claim 11 wherein said polyaniline is heated to said temperature for 1 to 30 minutes.

13. The method of claim 1 wherein said polyaniline is heated to a temperature above 70° C. for a period of time sufficient to lower an initial resistance of said polyaniline by at least 50% of said initial resistance.

14. The method of claim 13 wherein said heating of said polyaniline is to a temperature of between 100° C. and 175° C. for 1 to 30 minutes and said polyaniline is cooled to ambient temperature while its resistance is lowered by at least 50% of said initial resistance.

15. The method of claim 1 wherein said polyaniline is provided as a coating on a substrate prior to said treatment steps.

16. The method of claim 15, wherein said substrate is selected from the group consisting of nylon, polyester, glass, acrylic, quartz and ceramic fibers, aramid, PEEK and benzimidazole.

17. The method of claim 16 wherein said heating of said polyaniline is to a temperature of between 70° C. and 200° C.

18. A method of treating polyaniline, wherein said polyaniline is a polymer of monomer units selected from aniline, o- and m- methoxyaniline, o- and m- ethoxyaniline, o- and m- toluidine, o- and m- chloroaniline, wherein said monomer units are chemically oxidized in a reaction solution to form said polymer, said treatment comprising the steps of: doping said polyaniline with a non-volatile acid, said polyaniline having an initial resistance, and heating said polyaniline while removed from said reaction solution to a temperature of from 70° C. to 200° C. for a period of time sufficient to lower its resistance by at least 25% of said initial resistance, and cooling said polyaniline to ambient temperature while its resistance is at a level which is at least 25% of said initial resistance.

19. The method of claim 18 wherein said non-volatile acid has a boiling point of 150° C. or greater and a pKa of 3.0 or less.

20. The method of claim 18 wherein said non-volatile acid is selected from the group consisting of p-toluene sulfonic acid, benzene sulfonic acid, p-chlorobenzene sulfonic acid, trifluoromethane sulfonic acid and sulfuric acid.

21. The method of claim 18 wherein said monomer units are chemically oxidized in the presence of said non-volatile acid which is selected from the group consisting of: p-toluenesulfonic acid, benzenesulfonic acid, p-chlorobenzenesulfonic acid, trifluoromethanesulfonic acid, sulfuric acid, 1,5-naphthalene-disulfonic acid, and 2,6-naphthalenedisulfonic acid.

22. The method of claim 18 wherein said polyaniline is heated to a temperature of from 70° C. to 200° C. for a period of time sufficient to lower an initial resistance of said polyaniline by at least 50% of said initial resistance.

23. The method of claim 18, wherein said polyaniline is provided as a coating on a substrate prior to said treatment steps.

24. The method of claim 23, wherein said substrate is selected from the group consisting of nylon, polyester, glass, acrylic, quartz and ceramic fibers, aramide, PEEK and benzimidazole.

* * * * *